United States Patent [19]

Takenoya et al.

[11] 4,210,088

[45] Jul. 1, 1980

[54] SEWING MACHINE WITH AN ELECTRONIC PATTERN STITCH CONTROL SYSTEM

[75] Inventors: Hideaki Takenoya, Hachioji; Hachiro Makabe, Fussa, both of Japan

[73] Assignee: Janome Sewing Machine Co. Ltd., Tokyo, Japan

[21] Appl. No.: 914,940

[22] Filed: Jun. 12, 1978

[51] Int. Cl.$^2$ ............................................. D05B 3/02
[52] U.S. Cl. ................................................. 112/158 E
[58] Field of Search .......... 112/158 E, 121.11, 121.12; 318/567, 569

[56] References Cited

U.S. PATENT DOCUMENTS

| | | | |
|---|---|---|---|
| 3,855,956 | 12/1974 | Wurst | 112/158 E |
| 4,085,691 | 4/1978 | Coughenour et al. | 112/158 E |
| 4,086,862 | 5/1978 | Makabe et al. | 112/121.11 X |

*Primary Examiner*—Peter P. Nerbun
*Attorney, Agent, or Firm*—Michael J. Striker

[57] ABSTRACT

When a pattern is selected a pattern-identifying code word is persistently held, the system referring to this code word during pattern formation. A free-running pulse generator applies pulses to an addressing counter, unsynchronized with machine operation, and at a speed much higher than the speed of machine rotation. As the addressing counter assumes successive counts, successive data appear at the outputs of an addressed ROM. At least some of this memory-output data is continually compared to the pattern-identifying code word, to ascertain whether certain predetermined relationships between the memory-output data and pattern-identifying code word exist; these relationships include identity, but are not limited to simple identity. This ongoing comparison determines how many steps the counter is to be allowed to run through before the next stitch-forming operation is performed. Meanwhile, at least some of the memory-output data is being applied to an adder having feedback, through the intermediary of logic gates. The output signals of the adder constitute potential stitch-control data. As the counter counts, sometimes the output signals produced by the adder are fed back and added to the input signals applied to the adder's input, the potential stitch-control data being generated in this way. When the counter stops counting, the output signals now present on the adder will constitute the stitch-control data for the next stitching operation to be performed.

3 Claims, 7 Drawing Figures

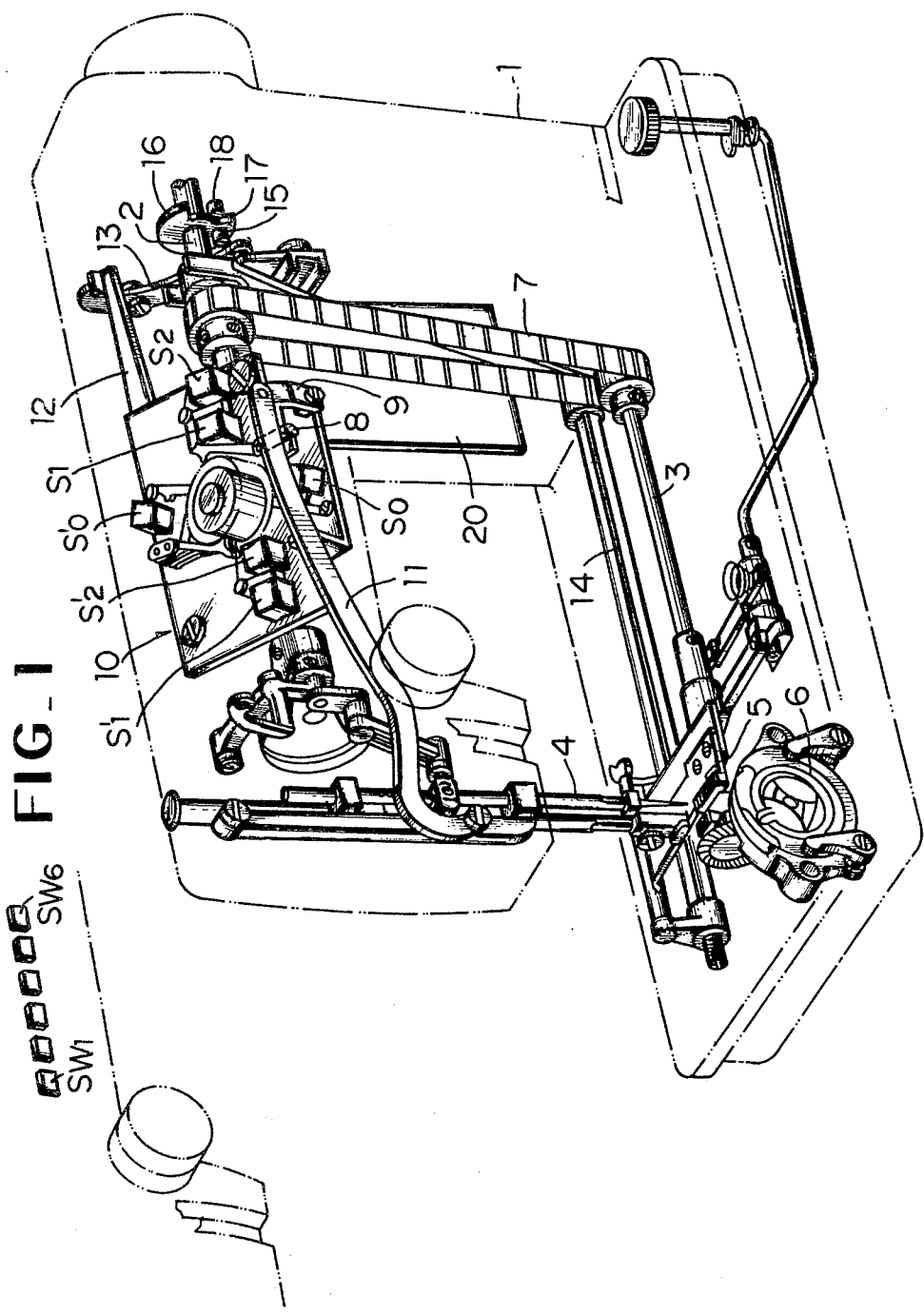
FIG_1

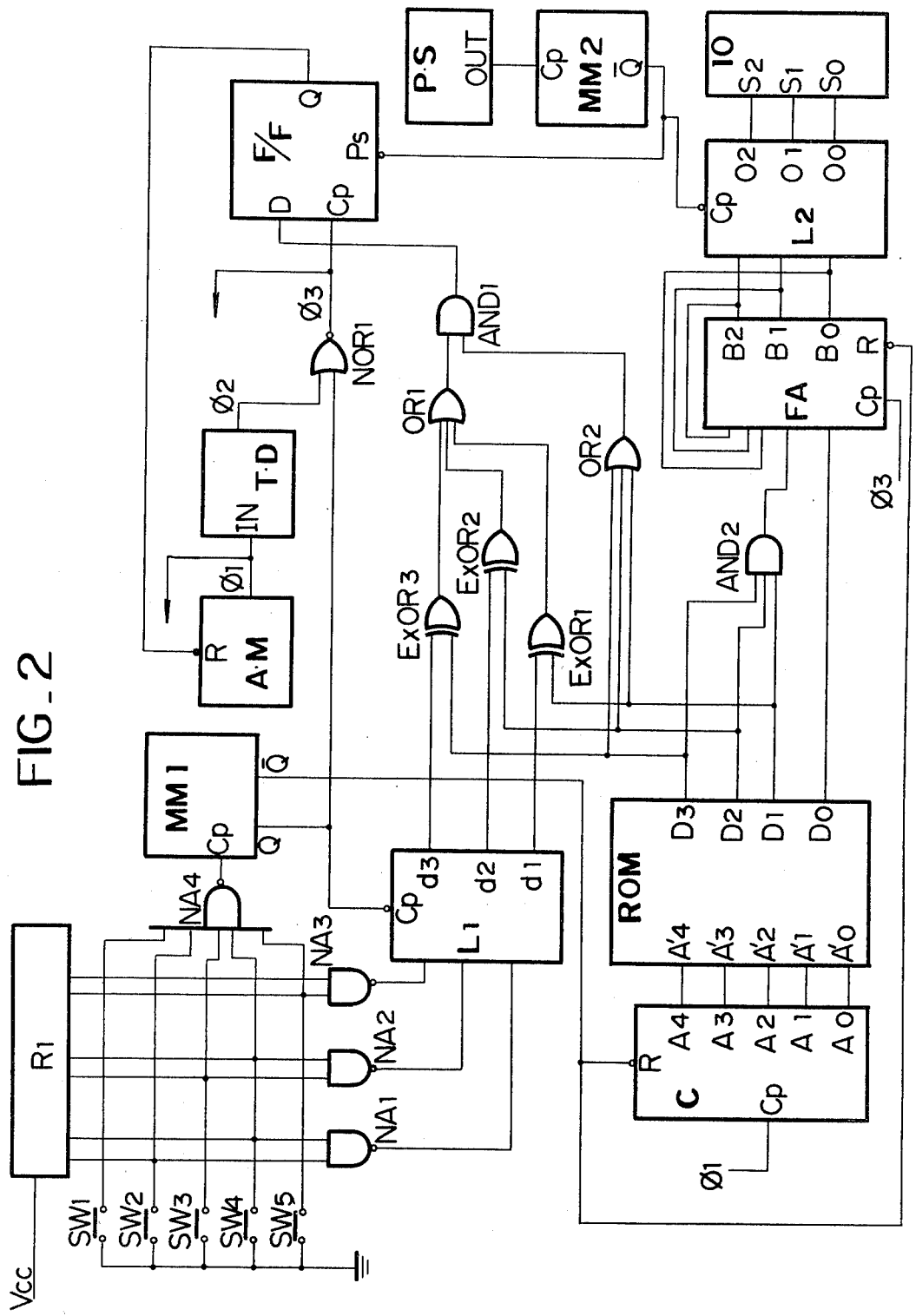
FIG_2

FIG_3
Needle position coordinates
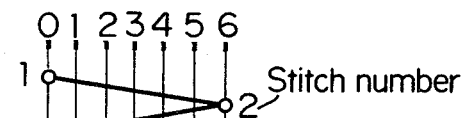
Pattern No. 1
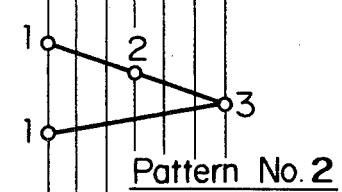
Pattern No. 2
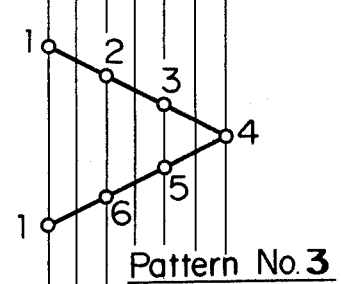
Pattern No. 3
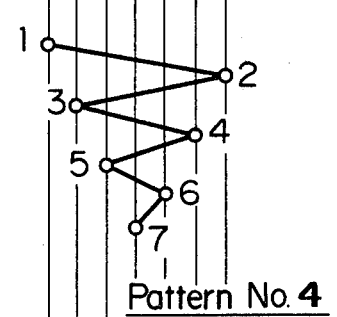
Pattern No. 4
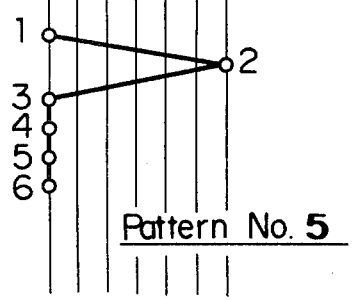
Pattern No. 5
FIG_5
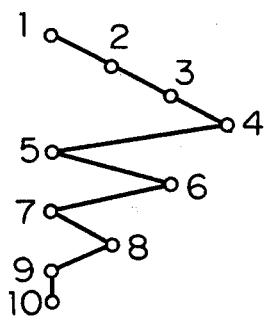

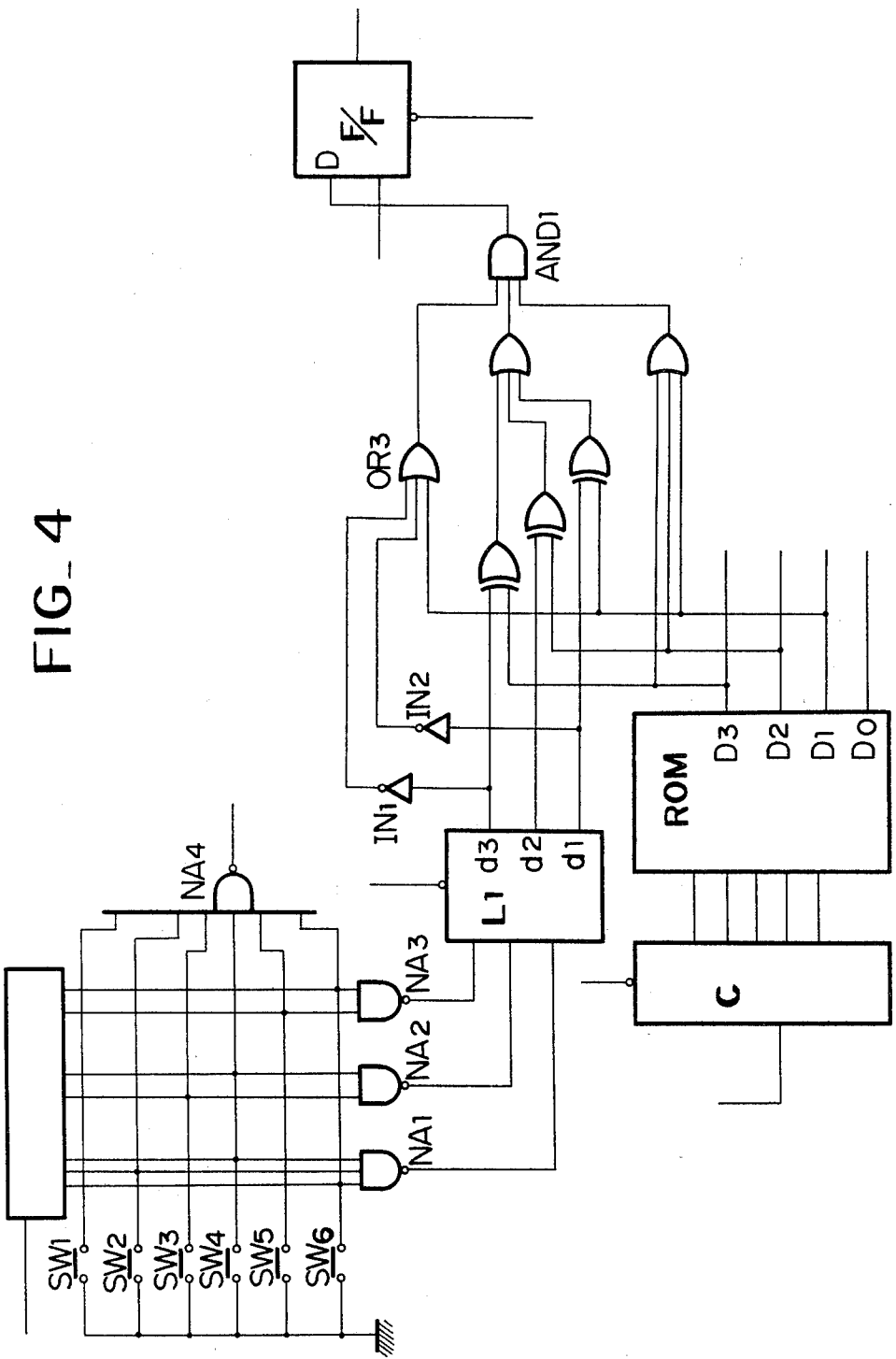
FIG_4

FIG_6

| Address | D3 | D2 | D1 | D0 | B2 | B1 | B0 |
|---|---|---|---|---|---|---|---|
| 0 | 0 | 0 | 0 | 0 | 0 | 0 | 0 |
| 1 | 1 | 1 | 1 | 0 | 0 | 1 | 0 |
| 2 | 0 | 1 | 0 | 0 | 0 | 1 | 0 |
| 3 | 0 | 0 | 1 | 1 | 0 | 1 | 1 |
| 4 | 0 | 1 | 0 | 1 | 1 | 0 | 0 |
| 5 | 1 | 1 | 1 | 0 | 1 | 1 | 0 |
| 6 | 0 | 0 | 0 | 0 | 1 | 1 | 0 |
| 7 | 1 | 0 | 0 | 1 | 0 | 0 | 0 |
| 8 | 0 | 1 | 1 | 1 | 0 | 0 | 1 |
| 9 | 1 | 1 | 1 | 1 | 1 | 0 | 0 |
| 10 | 0 | 1 | 0 | 0 | 1 | 0 | 0 |
| 11 | 0 | 1 | 1 | 1 | 1 | 0 | 1 |
| 12 | 1 | 1 | 1 | 0 | 0 | 0 | 0 |
| 13 | 1 | 0 | 0 | 0 | 0 | 0 | 0 |
| 14 | 1 | 1 | 1 | 0 | 0 | 1 | 0 |
| 15 | 0 | 1 | 0 | 0 | 0 | 1 | 0 |
| 16 | 0 | 1 | 1 | 0 | 0 | 1 | 0 |
| 17 | 1 | 1 | 1 | 0 | 1 | 0 | 0 |
| 18 | 0 | 1 | 1 | 0 | 1 | 0 | 0 |
| 19 | 1 | 1 | 1 | 1 | 0 | 0 | 0 |
| 20 | 1 | 0 | 0 | 0 | 0 | 0 | 0 |
| 21 | 1 | 1 | 1 | 1 | 0 | 1 | 1 |
| 22 | 0 | 1 | 1 | 0 | 0 | 1 | 1 |
| 23 | 1 | 1 | 1 | 0 | 1 | 0 | 1 |
| 24 | 1 | 1 | 1 | 0 | 0 | 0 | 0 |
| 25 | 1 | 0 | 0 | 0 | 0 | 0 | 0 |

FIG_7

| | B2 B1 B0 | Pattern number | D3 D2 D1 D0 |
|---|---|---|---|
| 1 | 0 0 0 | 1.2.3.4.5 | 0 0 0 0 |
| 2 | ~~0~~ ~~0~~ ~~1~~ ↗ 0 1 0 | | 1 1 1 0 |
| 3 | 0 1 0 | 3 | 0 1 0 0 |
| 4 | 0 1 1 | 2 | 0 0 1 1 |
| 5 | 1 0 0 | 3 | 0 1 0 1 |
| 6 | ~~1~~ ~~0~~ ~~1~~ ↗ 1 1 0 | | 1 1 1 0 |
| 7 | 1 1 0 | 1.2.3.4.5 | 0 0 0 0 |
| 8 | 0 0 0 | 5 | 1 0 0 1 |
| 9 | 0 0 1 | 4 | 0 1 1 1 |
| 10 | ~~0~~ ~~1~~ ~~0~~ ↗ 1 0 0 | | 1 1 1 1 |
| 11 | ~~0~~ ~~1~~ ~~1~~ | | |
| 12 | 1 0 0 | 3 | 0 1 0 0 |

SEWING MACHINE WITH AN ELECTRONIC PATTERN STITCH CONTROL SYSTEM

BRIEF DESCRIPTION OF THE INVENTION

This invention relates a sewing machine with an electronic stitch control system, in which stored data are effectively used by means of an electronic device including a semi-conductor memorizing device in order to produce stitches in pattern.

The widely used recent sewing machines are provided with a mechanical memory such as the disc cams. Such a mechanical memory becomes bulky to a limited space in a sewing machine as the stored data increase for the requirement or desires of the consumer. Regarding the sewing machines provided with a semiconductor memory, it has been desired that the stored data must be effectively used to produce various types of patterns with an easy setting operation.

The present invention has been provided to eliminate the defects and disadvantages of the prior art and to satisfy the requirements and desire of the consumer.

It is a primary object of the invention to provide a simplified mechanism at low cost.

It is another object of the invention to provide a mechanism excellent in operation and exact in setting preparations.

It is a further object of the invention to provide a mechanism for effectively utilizing the memorizing mechanism.

Other features and advantages of the invention will be apparent from the following description of preferred embodiments of the invention in reference to the attached drawings.

BRIEF DESCRIPTION OF THE DRAWINGS

FIG. 1 is a sewing machine of the invention, partially omitted to clearly show the invention, FIG. 2 is an embodiment of a pattern control circuit diagram of the above, FIG. 3 is a representation of stitches in patterns by way of example produced by the invention, FIG. 4 is an embodiment of partially modified pattern control circuit diagram in FIG. 2 for forming combined patterns, FIG. 5 is a representation of a combined pattern by way of example produced by the invention, FIG. 6 is a table showing the relations between the outputs of memory (ROM) and those of the adder (FA) in FIG. 2, and FIG. 7 is an explanatory table for making the table in FIG. 6.

DETAILED DESCRIPTION OF THE INVENTION

In reference to the sewing machine shown in FIG. 1, a reference numeral (1) designates a machine housing. A numeral (2) is an upper shaft of the sewing machine and (3) is a lower shaft. (4) is a needle bar with a needle at the lower end thereof. (5) is a feed dog to feed a sewn material. (6) is a loop taker. If the upper shaft (2) is driven by an electric motor, the needle bar (4) is vertically reciprocated through the crank mechanism, and the lower shaft (3) is rotated through a timing belt (7) to rotate the loop taker. A numeral (10) denotes a stitch control system which gives an output to actuate a swingable arm (9) through another swingable arm (8) and to laterally swing the needle bar (4) through a transmission rod (11). The stitch control system (10) actuates an arm (12) which swings a lever (13). The swinging movement of the arm is transmitted to the feed dog (5) through a transmission rod (14). Namely the stitch control system (10) issues stitch control signals, through the control circuit as shown in FIG. 2 or FIG. 4, to solenoids (S0)(S1)(S2) or (S'0)(S'1)(S'2) which control the swinging movement of the needle bar and the feeding amplitude or direction of the feed dog (5) in a manner as will be described herein. The reference numeral (20) denotes a program control unit in which the control circuit is located. The numeral (15) shows a photo-transistor mounted on the machine housing, which receives a light from a luminous diode (18) through a cutout (17) of a screen disc (16) fixedly mounted on the upper shaft (2) for rotation therewith, thereby to give a signal to the program control unit (20) in synchronism with rotation of the upper shaft. (SW1)–(SW6) are pattern selecting switches provided on the front face of the machine housing for selecting desired stitching patterns. The stitch control system (10) consists of an adder mechanism (not shown) and a set of solenoids (S0)(S1)(S2) for controlling the needle bar swinging movement. The stitch control system (10) further consists of another adder mechanism (not shown) and another set of solenoids (S'0)(S'1)(S'2) for controlling the feeding amount or direction of the feed dog. These two sets of solenoids are independently actuated to give the swingable arm (8) and the arm (12) the shift amount of the relative ratios 1:2:4: respectively, thereby to give the added shift amount from 0 to 6 to the needle bar (4) and the feed dog (5).

FIG. 2 shows a pattern control circuit diagram of the invention, with which only a needle bar control system is described here, and the description of a cloth feed control system is omitted for simplification of the explanation. (SW1)–(SW4) are normally opened pattern selecting switches each having one end connected to the ground and the other end connected to a trigger terminal (Cp) of a monostable multivibrator (MM1) via NAND circuit (NA4), and also connected to an input side of Latch circuit (L1) via NAND circuits (NA1)-(NA2)(NA3) in order to encode the operated condition of the switch to logic values 0 0 0–1 0 0, without including the logic values 1 1 1. (Vcc) is a control DC power source, and (R1) is a usually used limiting source. The monostable multivibrator (MM1) has a true side output terminal (Q) connected to the trigger terminal (Cp) of the Latch circuit (L1) for issuing the encoded signal to output terminals (d3)(d2)(d1) of the Latch circuit when any one of the switches (SW1)–(SW5) is operated. The counter (C) is of master-slave type, and the resetting terminal (R) is connected to a complement side terminal ($\bar{Q}$) of the monostable multivibrator (MM1). The counter (C) has a set of 5-bit output terminals (A0)–(A4) connected respectively to the input terminals (A'0)–(A'4) of a static memory (ROM) for giving an output of progressive code each time when the input terminal (Cp) receives a pulse input ($\phi$1), and in the present embodiment, when the inputs (A4)(A3)(A2)(A1)(A0) reach up to the decimal number 25, i.e., the code 11001, then they return to 0, i.e. 0 0 0 0 0. Respective outputs (D1)(D2)(D3) of the memory (ROM) are connected to the input terminals of exclusive OR circuits (EXOR1-)(EXOR2)(EXOR3) in match with the output terminals (d1)(d2)(d3)(d4) of the Latch circuit (L1). The respective outputs of these exclusive OR circuits are connected to inputs of the OR circuit (OR1) which has the output terminal connected to one of the inputs of AND circuit (AND1) which has the other input terminal connected to an output of the OR circuit (OR2) which has the input terminals connected to outputs (D1)(D2)(D3) of the memory (ROM). The output side of the AND circuit (AND1) is connected to a data terminal (D) of a D type flip-flop circuit (F/F). The output (Q) of the flip-flop circuit is designed to have the output (Q) to be reset the 0 when the power source (Vcc) is applied. This output terminal (Q) is connected to a reset terminal (R) of an astable multivibrator (AM) which has a pulse output terminal ($\phi$1) connected to an input terminal (IN) of a time delay circuit (TD), and also connected to the input terminal (Cp) of the counter (C). An output terminal ($\phi$2) of the delay circuit (TD) and the true side terminal (Q) of the monostable multivibrator (MM1) are connected to the trigger terminal (Cp) of the flip-flop circuit (F/F) through an output ($\phi$3) of NOR circuit (NOR1). The outputs (D1)(D2)(D3) of the memory (ROM) are connected to inputs of the AND circuit (AND2) which has an output connected to the upper one of the two bits of the master-slave type 3-bit full adder (FA), and the output (D0) of the memory (ROM) is connected to the lower bit of the adder (FA). A code consisting of the outputs (B0)(B1)(B2) of the adder (FA) is fed back as an added value to the inputs of the adder itself. A resetting terminal (R) of the adder is connected to the complement terminal ($\overline{Q}$) of the monostable multivibrator (MM1), and a trigger terminal (Cp) of the adder is connected to the output ($\phi$3) of the NOR circuit (NOR1). Each time when the trigger terminal (Cp) receives an output ($\phi$3) from the NOR circuit (NOR1), the 3-bit output codes of the adder are added with the 2-bit values from the memory (ROM). Thus the adder (FA) serves as an output counter. In this embodiment, the adder is able to give outputs of 0–6 in the considered decimal number and is prohibited from giving the output 1 1 1 of the 3-bit outputs. The outputs of the adder are connected to inputs of the Latch circuit (L2) which has outputs (00)(01)(02) respectively connected to solenoids (S0)(S1))(S2) of the stitch control system (10). (P.S.) is a position sensor including the phototransistor (15) and having an output terminal (OUT) connected to a trigger terminal (Cp) of a monostable multivibrator (MM2) which has a complement side terminal ($\overline{Q}$) connected to a preset terminal (Ps) of the flip-flop circuit (F/F) and to the trigger terminal (Cp) of the latch circuit (L2). Thus the position sensor (PS) issues a signal in synchronism with rotation of the sewing machine, per rotation of the upper shaft (2), to the trigger terminal (Cp) of the monostable multivibrator (MM2), and therefore to the preset terminal (Ps) of the flip-flop (F/F) and to the trigger terminal (Cp) of the latch circuit (L2) while the needle bar is at a predetermined position. The signal is designed, at its falling time, to preset the preset terminal (Ps) of the flip-flop circuit (F/F) and to cause the Latch circuit (L2) to register the outputs from the adder (FA) so as to apply the outputs to the stitch control system (10). For the purpose of forming the stitch patterns as shown in FIG. 3 by way of example, the memory (ROM) stores signals so as to apply to the output terminals (D3)(D2)(D1)(D0) the address codes consisting of the inputs (A'4), (A'3), (A'2), (A'1), (A'0), in accordance to the decimal numbers 0–25 as shown in FIG. 6.

With the foregoing explanation of the control circuit in FIG. 2, if the power source (Vcc) is thrown, the output (Q) of the flip-flop circuit (F/F) becomes the logic value 0 and the astable multivibrator (AM) gives no output. Then, if a switch (SW3) is operated for selecting an optional pattern, e.g. a pattern 3 in FIG. 3, the outputs (d3) (d2)(d1) of the Latch circuit (L1) are registered with the logic values 0 1 0, and at this time the counter (C) and the adder (FA) are reset. Since the counter (C) assumes a first address 0 in FIG. 6 and the output codes (D3)(D2)(D1)(D0) of the memory (ROM) become 0 0 0 0 in response to the first address 0, the output of the OR circuit (OR2) is made 0 and the data terminal (D) of the flip-flop circuit (F/F) is made 0, irrespectively of the values of the outputs (d1)(d2)(d3) of the Latch circuit (L1), and the output (Q) is not inverted. Therefore, the output ($\phi$1) of the astable multivibrator (AM) is not generated, and the counter (C) is not actuated. After the switch (SW3) is operated, the monostable multivibrator (MM1) is made inoperative and the adder (FA) is released from the reset condition. However, since the addition inputs (AND2)(D0) are 0 0 , the outputs (B2)(B1)(B0) are not added with the reset values by the output ($\phi$1) of the NOR circuit (NOR1) generated at the folling signal in the true side (Q) of the monostable multivibrator (MM1), and are 0 0 0 . When the sewing machine is rotated and the position sensor (PS) comes to a determined position, the monostable multivibrator (MM2) is triggered and the output ($\overline{Q}$) thereof triggers the Latch circuit (L2) to latch the outputs (B2)(B1)(B0) of the adder (FA) on the terminals (02)(01)(00) of the Latch (L2). Thus the first stitch signal 0 0 0 of the pattern 3 is applied to the stitch control system (10). Then, the output signal (Q) of the monostable multivibrator (MM2) presets the flip-flop circuit (F/F), and the astable multivibrator (AM) is released from the reset condition and issues the successive pulse outputs ($\phi$1), with a period considerably faster than the rotation period of the sewing machine, which pulses are counted up by the counter (C). Since the counter is of the masterslave type, it gives the counted data from the output terminals (A0)–(A4) at each time the pulse ($\phi$1) falls. With such a first count-up, the counter (C) gives a decimal output 1 corresponding to the address 1 in FIG. 6, and the outputs (D3)(D2)(D1)(D0) of the memory (ROM) become 1 1 1 0. These signals 1 1 1 0 cause the adder inputs (AND2),(D0) to receive the code 1 0, i.e. 2 considered as a decimal number and render the outputs (B2)(B1)(B0) from the first stitch control signals 0 0 0 to 0 1 0. Then, the signals 0 1 0 of the outputs (d3)(d2)(d1) of the Latch circuit (L1) are compared with the signal 1 1 1 of the outputs (D3)(D2)(D1) to cause the data terminal (D) of the flip-flop circuit (F/F) to be 1, and the output (Q) thereof maintains 1 to advance the counting of the counter (C). When the outputs of the memory (ROM) become 0 1 0 0 in correspondence to the address 2 by a subsequent count, these outputs are compared with the output signals 0 1 0 of the Latch circuit (L1), thereby to render the OR circuit (OR1) to be 0. Thus, the data terminal (D) of the flip-flop circuit (F/F) is made 0, and the outputs (Q) is inverted at the falling time of the output ($\phi$2) of the delay circuit (TD) and the pulse ($\phi$1) is stopped. The outputs signals 0 1 0 0 of the memory render the adder inputs of the adder (FA) to be 0 0, and do not change the output signals 0 1 0. When the sewing machine is further rotated and the position sensor (PS) comes to the determined position, the Latch circuit (L2) is triggered to give the signals 0 1 0 for the second stitch of the pattern 3 to the stitch control system (10). At the same time, the flip-flop circuit (F/F) is preset and the counter (C) counts up. Similarly, counting-up of the counter (C) is stopped each time when the outputs (D3)(D2)(D1) of the memory (ROM) are 0 0 0 or 0 1 0. That is, the signals for the third stitch are 1 0 0 in correspondence to an address 4 in FIG. 6, and the signals for the fourth stitch are 1 1 0 in correspondence to an address 6, and the signals for the fifth stitch are 1 0 0 in correspondence to an address 10, and the signals for the sixth stitch are 0 1 0 in correspondence to an address 15. These stitch control signals are applied sequentially to the stitch control system (10) per rotation of the sewing machine. The codes in FIG. 6 terminate with 0 0 0 which is a set of outputs (B2)(B1)(B0) of the adder (FA) in correspondence to the final count 25 of the counter (C). Namely the outputs (B2)(B1)(0) of the adder (FA) are reset to 0 0 0 by the final count of the counter (C). In this instance, after the adder (FA) has issued the sixth stitch control signals, the counter gives the address 25 and thereafter gives the address 0, and then stops counting for the first stitch control signals. In this time, the output signals 0 0 0 0 of the memory (ROM) do not add the signals 0 0 0 of the outputs (B2)(B1)(B0). Subsequently, the pattern 3 is repeatedly formed in the same manner. FIG. 3 shows the patterns with a constant feeding amount.

The arrangement of the data stored in the memory (ROM) as shown in FIG. 6 will be explained in reference to FIGS. 3 and 7. By way of example, the codes 0 0 0–1 1 0 for the needle position coordinates 0–6 in FIG. 3, which consist of the outputs (B2), (B1), (B0) of the adder (FA), are repeatedly inscribed in the progressively increased condition in the columns 1–12 of the table in FIG. 7. Following the order of the codes, the pattern numbers are inscribed in accordance to the progressive stitch numbers corresponding to the codes. The code 0 0 1 in the second column of the table in FIG. 7 agrees with the stitch number 3 of the pattern 4. But the pattern 4 has not the stitch 2 arranged in the preceding column, namely in the first column. Therefore, the second column is made blank. Such blank codes are erased by the erasing lines as shown. As understood from FIG. 3, a plurality of patterns numbers, for example, 1, 2, 3, 4 and 5 are inscribed in correspondence only to the coordinate codes 0 0 0 and 1 1 0 which are commonly included in such patterns. Such an inscribing operation is made in relation to the patterns to be produced. The pattern 1 can be formed by reading out the codes from the first to the seventh column. Therefore the pattern number 1 is not inscribed in correspondence to the code 0 0 0 in the eighth column.

Now in determining the codes for the outputs (D3), (D2), (D1), (D0) of the memory (ROM), the first and the seventh columns in FIG. 7, in which the patterns 1, 2, 3, 4, 5 have been inscribed, are made 0 0 0 0. This is because the upper 3 bits 0 0 0 are designed in common to all the patterns 1-5, to make 0 of the output of the flip-flop circuit (F/F) through the OR circuit (OR2) so as to stop the count-up of the counter (C), and because the upper 3 bits 0 0 0 and the lowest 1 bit 0 are together designed to make 0 0 of the adder inputs (AND2), (D0) of the adder (FA). Thus the respective output codes are made up in correspondence to the address 0 in FIG. 6.

As there is no pattern inscribed in correspondence to the code 0 0 1 in the second column in FIG. 7, the code 0 1 0 in the third column must be read out. Namely in order to change the coordinate code 0 0 0 to 0 1 0, the outputs of the memory (ROM) are made 1 1 1 0, of which the upper 3 bits include no pattern selecting signals, thereby to make 1 0 of the adder inputs (AND2) (D0) of the adder (FA), namely to provide thereto a decimal added digit 2. Thus the coordinate outputs (B2), (B1), (B0) produce the code 0 1 0, instead of the code 0 0 1. In this manner, the respective output codes are made up in correspondence to the address 1 in FIG. 6.

Then, in order to stop the operation of the counter (C) with the code 0 1 0 of the outputs of the latch circuit (L1) without advancing the coordinate code of the outputs of the adder (FA) when the pattern 3 is selected, the outputs of the memory (ROM) are designed to include 0 1 0 in the upper 3 bits thereof and 0 in the lowest 1 bit thereof. Namely the code 0 1 0 0 provides the added digit 0 to the adder inputs of the adder (FA). Thus the respective output codes are made up in correspondence to the address 2 in FIG. 6. In the next step, when the pattern 2 is selected, the code 0 0 1 of the outputs of the latch circuit (L1), stops the count-up of the counter (C) and at the same time advances the coordinate code of the outputs of the adder (AF) from 0 1 0 to 0 1 1. Namely the outputs of the memory (ROM) become 0 0 1 1 so as to add the decimal digit 1 to the adder inputs of the adder (FA). As the result, the respective codes are made up in correspondence to the address 3 in FIG. 6. In the same manner, the codes are made up in correspondence to the addresses 5-9 of the table in FIG. 6.

In the table in FIG. 7, since the tenth and the eleventh columns of the outputs of the adder (FA) are blank, the outputs of the memory (ROM) become 1 1 1 1 which include no pattern selecting codes, so as to advance the adder inputs of the adder (FA) by the decimal digit 3. Thus the codes of the outputs of the memory (ROM) are made up in the table in FIG. 6, and the pattern selecting code 1 0 0 for the pattern 5 is in correspondence to the address 25. Therefore, if the pattern 5 is selected, the counter (C) stops after it has counted up the address 25. However, regarding the other patterns, the counter (C) counts up the address 0. In this case, the outputs 0 0 0 0 of the memory (ROM) do not add to the outputs 0 0 0 of the adder (FA). This means that the outputs (B2), (B1), (B0) of the adder (FA) are reset when the address 25 is counted up.

It is one of the features of the invention to form combined patterns which are combinations of a plurality of different patterns. For this purpose, the pattern control circuit in FIG. 2 is partially modified as shown in FIG. 4. This is because the counter (C) is stopped when the outputs (D3)(D2)(D1) of the memory (ROM) become 0 0 0 common to each of the patterns, and 0 1 0 in correspondence to the pattern 3, and 1 0 0 in correspondence to the pattern 5 as the address advances in FIG. 6, thereby to form a combined pattern as shown in FIG. 5. The control circuit diagram in FIG. 4 will be referred to. (SW6) is a switch for selecting the combined pattern in FIG. 5. When this switch is operated, outputs (d3)(d2)(d1) of the Latch circuit (L1) are latched with the code 1 0 1. When the code is 1 0 1, inverters (IN1-)(IN2) render the inputs of the OR circuit (OR3) to be 0 0 0, which are connected to the outputs of the Latch circuit (L1). Therefore, only at operation of the switch (SW6), the output (D1) of the memory (ROM) becomes available to the input terminal of the OR circuit (OR3). Since the output (D1) of the memory (ROM) is 0 only to the common patterns and to the patterns 3 and 5, the co-ordinate data (B2)(B1)(B0) where the output (D1) in FIG. 4 is 0 form the pattern in FIG. 5 as the address advances.

What is claimed is:

1. A sewing machine having pattern forming instrumentalities forming stitches by changing the relative positions of the needle and the sewn material, comprising pattern selecting means selectively operated to produce specific signals pertaining the selected pattern to be stitched; static memory means storing control signals; free-running pulse generator means producing free-running pulses for reading out the control signals from the static memory means; means comparing the pattern selecting signals and the control signals read out of the static memory means, thereby to stop the operation of the free-running pulse generator means; counter means operated in accordance to the control signals of the static memory to produce counting signals; and pulse generator means operated in synchronism with the pattern forming instrumentalities to produce signals to make effective the counting signals to the pattern forming instrumentalities.

2. A sewing machine as defined in claim 1, wherein the means for stopping the operation of the free-running pulse generator means includes at least the static memory means storing stop-signals common to a plurality of patterns to be stitched and stop signals specifically pertaining the respective patterns to be stitched.

3. A sewing machine as defined in claim 1, wherein the counter means includes a full adder for counting up with the outputs thereof and the outputs of the static memory to be added to the former outputs, thereby to determine the needle coordinates of the sewing machine.

* * * * *